United States Patent
Ogura et al.

(10) Patent No.: US 12,420,424 B2
(45) Date of Patent: Sep. 23, 2025

(54) COORDINATE SYSTEM SETTING SYSTEM AND POSITION/ORIENTATION MEASUREMENT SYSTEM

(71) Applicant: FANUC CORPORATION, Yamanashi (JP)

(72) Inventors: Shoutarou Ogura, Yamanashi (JP); Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 229 days.

(21) Appl. No.: 17/995,974

(22) PCT Filed: Apr. 12, 2021

(86) PCT No.: PCT/JP2021/015189
§ 371 (c)(1),
(2) Date: Oct. 11, 2022

(87) PCT Pub. No.: WO2021/210540
PCT Pub. Date: Oct. 21, 2021

(65) Prior Publication Data
US 2023/0191612 A1    Jun. 22, 2023

(30) Foreign Application Priority Data
Apr. 14, 2020  (JP) .................. 2020-072342

(51) Int. Cl.
*B25J 9/16*    (2006.01)
(52) U.S. Cl.
CPC ........... *B25J 9/1692* (2013.01); *B25J 9/1697* (2013.01)

(58) Field of Classification Search
CPC ............................. B25J 9/1692; B25J 9/1697
See application file for complete search history.

(56) References Cited

U.S. PATENT DOCUMENTS 5,329,469 A  *  7/1994  Watanabe ............ G06V 10/147
                                                     348/95
9,193,073 B1    11/2015  Huang et al.
(Continued)

FOREIGN PATENT DOCUMENTS

DE    11 2011 101 730 B4    3/2016
EP         2 853 356 A1      4/2015
(Continued)

OTHER PUBLICATIONS

International Search Report issued in PCT/JP2021/015189; mailed Jun. 8, 2021.

*Primary Examiner* — Jason Holloway
*Assistant Examiner* — Madison B Emmett
(74) *Attorney, Agent, or Firm* — Studebaker Brackett PLLC (57) ABSTRACT

Provided is a coordinate system setting system with which it is possible to easily set a coordinate system used in control of an industrial machine. A coordinate system setting system 1 comprises: a calibrated camera 4; a calibration data storage unit 12 that stores, in advance, calibration data obtained when the camera 4 was calibrated; an image processing unit 11 that processes a captured image obtained upon imaging a calibration jig J disposed at a position for which a coordinate system is to be set by the camera 4; and a coordinate system setting unit 21 that uses the result of image processing performed by the image processing unit 11 to set a coordinate system used in controlling a robot 2.

8 Claims, 8 Drawing Sheets

(56) References Cited

U.S. PATENT DOCUMENTS

| | | |
|---|---|---|
| 9,517,560 B2 | 12/2016 | Amano |
| 10,357,879 B2 * | 7/2019 | Hatanaka ............... B25J 9/1692 |
| 2017/0095930 A1 * | 4/2017 | Warashina ............. B25J 9/1697 |
| 2018/0021955 A1 * | 1/2018 | Hatanaka ............... B25J 9/1692 |
| | | 700/254 |
| 2018/0222049 A1 * | 8/2018 | Suzuki .................... B25J 9/161 |
| 2018/0333859 A1 * | 11/2018 | Ban ........................ B25J 19/023 |
| 2019/0160681 A1 * | 5/2019 | Suyama .................. B25J 17/02 |
| 2020/0130191 A1 * | 4/2020 | Inoue ..................... B23K 26/04 |
| 2023/0130816 A1 * | 4/2023 | Nakano ................... B25J 9/163 |
| | | 700/254 |

FOREIGN PATENT DOCUMENTS

| | | |
|---|---|---|
| JP | H03-251378 A | 11/1991 |
| JP | 2014-128845 A | 7/2014 |
| JP | 2018-094648 A | 6/2018 |
| JP | 2019-155556 A | 9/2019 |

\* cited by examiner

COORDINATE SYSTEM SETTING SYSTEM AND POSITION/ORIENTATION MEASUREMENT SYSTEM

TECHNICAL FIELD

The present disclosure relates to a coordinate system setting system and a position and orientation measurement system.

BACKGROUND ART

To create a program for compensating robot motion using an image processing device, it has been conventionally necessary to set a coordinate system for the compensation. There is known a technique in which a teacher operates a robot to touch up an origin, an X direction, a Y direction, and the like of the coordinate system, and adjusts a center point of a tip of a robot arm (TCP; Tool Center Point) of the robot to a specified position, to thereby set a coordinate system (for example, see Japanese Unexamined Patent Application, Publication No. H03-251378), Patent Document 1: Japanese Unexamined Patent Application, Publication No. H03-251378

DISCLOSURE OF THE INVENTION

Problems to be Solved by the Invention

However, the above-described touch-up operation requires time, and additionally, in the case of a teacher who is unfamiliar to the robot operation, a wrong coordinate system may be set, which prevents compensation by vision from working as expected. On the other hand, a technique is also proposed in which a coordinate system is automatically set to a calibration jig, but it is necessary to capture an image of the calibration jig from a plurality of viewpoints, which requires time.

Accordingly, it is desired to develop a technique which makes it possible to easily set a coordinate system for use in control of an industrial machine such as a robot.

Means for Solving the Problems

One aspect of the present disclosure provides a coordinate system setting system that sets a coordinate system for use in control of an industrial machine, the coordinate system setting system comprising: a calibrated visual sensor; a calibration data storage unit that stores, in advance, calibration data obtained when the visual sensor is calibrated; an image processing unit that processes a captured image obtained by capturing, by means of the visual sensor, an image of a calibration jig disposed at a position for which the coordinate system is to be set; and a coordinate system setting unit that uses a result of the image processing performed by the image processing unit to set a coordinate system for use in control of the industrial machine, wherein the coordinate system setting unit obtains a position of the calibration jig relative to a visual sensor position obtained based on the captured image obtained by capturing, by means of the visual sensor, the image of the calibration jig and the calibration data, and a visual sensor position relative to a reference position set in advance with respect to the industrial machine, the reference position being stored in the calibration data, and a position of the calibration jig relative to the reference position based on the position of the calibration jig relative to the visual sensor position and the visual sensor position relative to the reference position, and uses the position of the calibration jig relative to the reference position to set a coordinate system for use in control of the industrial machine.

Effects of the Invention

According to one aspect of the present disclosure, there can be provided a coordinate system setting system which makes it possible to easily set a coordinate system for use in control of an industrial machine.

PREFERRED MODE FOR CARRYING OUT THE INVENTION

Hereinafter, embodiments of the present disclosure will be described with reference to the drawings.

FIRST EMBODIMENT

A coordinate system setting system according to a first embodiment of the present disclosure is a system in which an image of a calibration jig disposed at a position for which a coordinate system for controlling robot motion is to be set is captured using a calibrated camera, which makes it possible to easily set the coordinate system without need for a teacher's robot operation.

Figure 1:
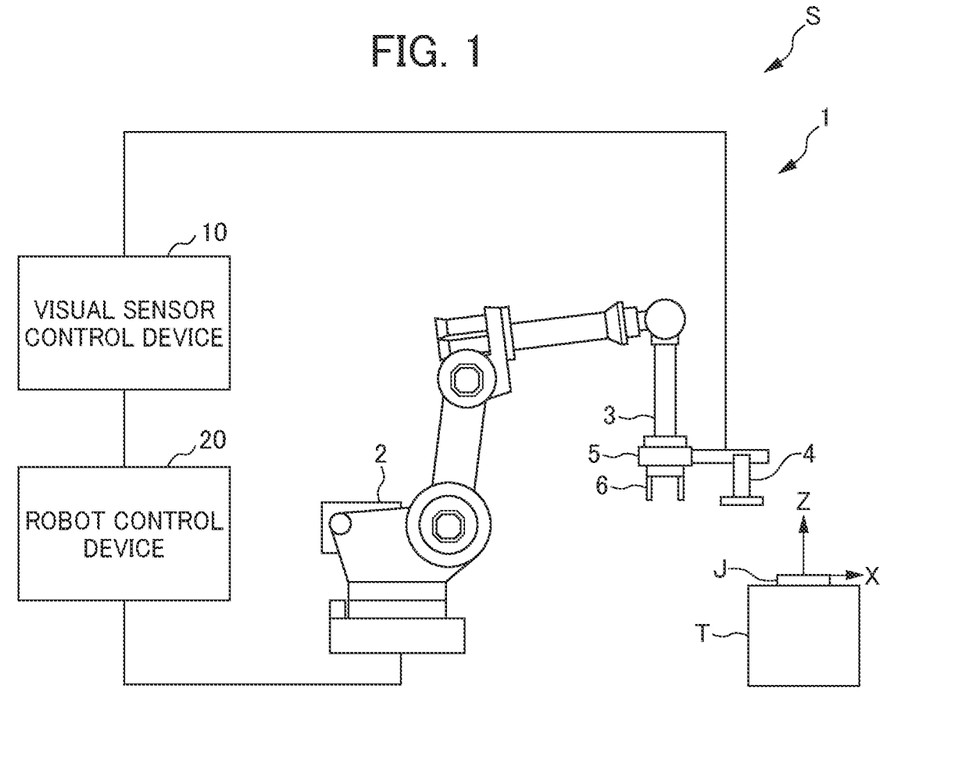
FIG. 1 is a diagram showing a configuration of a robot system according to a first embodiment of the present disclosure.

FIG. 1 is a diagram showing a configuration of a robot system S according to the first embodiment of the present disclosure. As shown in FIG. 1, the robot system S is configured to include a coordinate system setting system 1 according to the first embodiment of the present disclosure. The robot system S includes a robot 2 serving as an industrial machine, a camera 4 serving as a visual sensor, a visual sensor control device 10, a robot control device 20, and a calibration jig J. The robot system S is a system that recognizes a position of a workpiece based on, for example, a captured image of the workpiece captured by the camera 4, and performs predetermined work such as handling or machining on the workpiece.

A hand tip tool 6 is attached to a tip of a robot arm 3 of the robot 2 via a flange 5. The robot 2 performs the predetermined work such as handling or machining on the workpiece under control of the robot control device 20. The camera 4 is also attached to the tip of the robot arm 3 of the robot 2.

The camera 4 is controlled by the visual sensor control device 10 and captures an image of an object such as a workpiece to be image-captured. A calibrated camera is used as the camera 4. The visual sensor may be a general two-dimensional camera, or may be a three-dimensional sensor such as a stereoscopic camera. Alternatively, the camera 4 may be a hand camera attached to the flange 5 of the robot 2 as shown in FIG. 1, or may be a fixed camera fixedly mounted above a table T, for example.

The visual sensor control device 10 controls the camera 4 serving as a visual sensor. The visual sensor control device 10 detects a position and an orientation of the object to be image-captured from the captured image captured by the camera 4.

The robot control device 20 executes a motion program of the robot and controls the motion of the robot 2. At this time, the robot control device 20 compensates the motion of the robot 2 with respect to the position of the object such as a workpiece to be image-captured which is detected by the visual sensor control device 10, so that the robot 2 can perform the predetermined work.

The robot control device 20 controls the position and the orientation of the robot 2 to control the position and the orientation of the camera 4 when the camera 4 captures an image. In this way, the robot control device 20 controls the position and the orientation of the camera 4 while fixing the position and the orientation of the object to be image-captured, to thereby control a relative position of the object to be image-captured and the camera 4.

Figure 2:
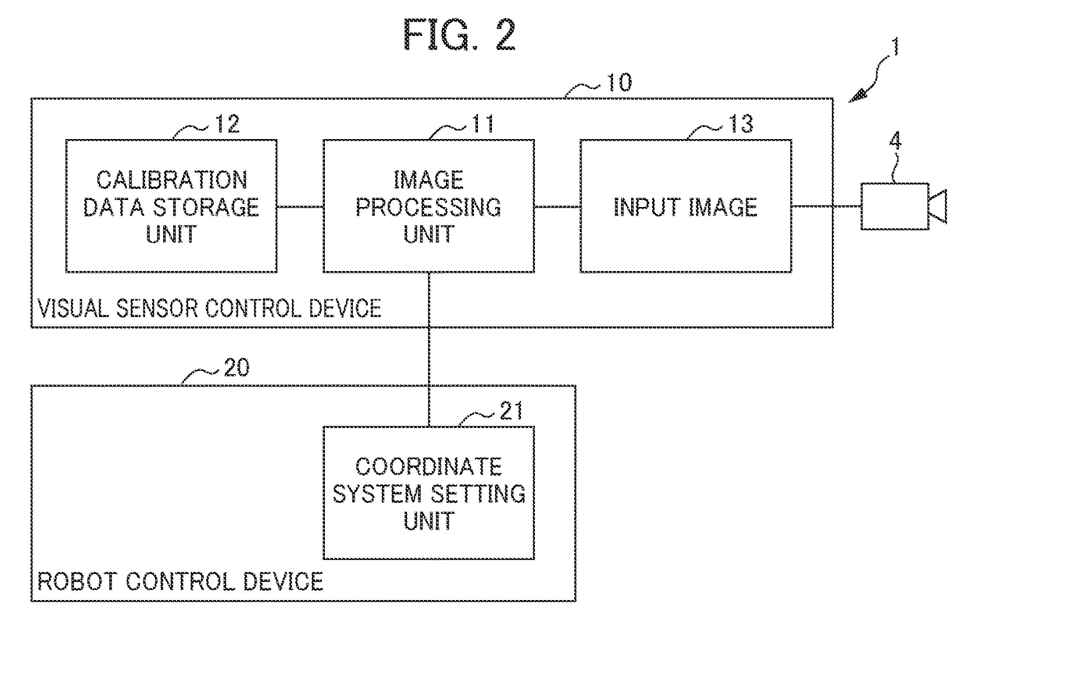
FIG. 2 is a block diagram showing a configuration of a coordinate system setting system according to the first embodiment of the present disclosure.

FIG. 2 is a block diagram showing a configuration of the coordinate system setting system 1 according to the first embodiment of the present disclosure. As shown in FIG. 2, the coordinate system setting system 1 according to the first embodiment of the present disclosure includes the camera 4 serving as a visual sensor, an image processing unit 11 and a calibration data storage unit 12 that constitute the visual sensor control device 10, and a coordinate system setting unit 21 that constitutes the robot control device 20.

When a captured image captured using the camera 4 is input as an input image 13 to the image processing unit 11, the image processing unit 11 processes the input image 13. More specifically, the image processing unit 11 detects an object from the input image 13 using, for example, a model pattern, and detects a position and an orientation of the object. In the first embodiment of the present disclosure, the image processing unit 11 processes a captured image obtained by capturing, by means of the camera 4, an image of the calibration jig J. More particularly, the image processing unit 11 processes a captured image obtained by capturing, by means of the camera 4, an image of the calibration jig J disposed at a position for which a coordinate system is to be set, as will be described later.

The image processing unit 11 in the visual sensor control device 10 and the robot control device 20 are configured by, for example, arithmetic processors such as a digital signal processor (DSP) and a field-programmable gate array (FPGA). Various functions of the image processing unit 11 in the visual sensor control device 10 and the robot control device 20 are achieved by executing predetermined software (programs, applications), for example. The various functions of the image processing unit 11 in the visual sensor control device 10 and the robot control device 20 may be achieved by cooperation between hardware and software, or may be achieved only by hardware (electronic circuits).

The calibration data storage unit 12 stores, in advance, calibration data obtained when the camera 4 is calibrated. The calibration data storage unit 12 in the visual sensor control device 10 is configured by, for example, a rewritable memory such as an electrically erasable programmable read-only memory (EEPROM).

An internal parameter and an external parameter of the camera 4 are stored in the calibration data for the camera 4. The internal parameter of the camera 4 is a parameter such as lens distortion and a focal length. The external parameter is a visual sensor position (position of the camera 4) relative to a reference position.

The coordinate system setting unit 21 sets a coordinate system for use in control of the robot 2 based on an image processing result by the image processing unit 11. Note that, in the first embodiment of the present disclosure, the coordinate system setting unit 21 is configured in the robot control device 20, but the configuration is not limited thereto. For example, the coordinate system setting unit 21 may be configured in the visual sensor control device 10.

The coordinate system setting unit 21 obtains a position of the calibration jig J relative to the visual sensor position based on the captured image obtained by capturing, by means of the camera 4, the image of the calibration jig J and the calibration data. That is, the coordinate system setting unit 21 obtains a position of the calibration jig J relative to the position of the camera 4 when the camera 4 captures an image of the calibration jig. This position of the calibration jig J is obtained in the same manner in either case of when the camera 4 is a hand camera and when the camera 4 is a fixed camera.

Note that the principle of obtaining a position of a calibration jig relative to the camera position from the position information of the calibration jig in the captured image captured using the calibrated camera is well known in "Computer vision: technical review and future view"; Matsuyama Takashi, and the like. That is, a geometric transformation characteristic inside the camera and a geometric relationship between a three-dimensional space in which an object is present and a two-dimensional image plane have already been obtained, and additionally, a distance between the camera and the calibration jig is uniquely obtained from the characteristics of the calibration jig, which makes it possible to uniquely determine a position of the calibration jig in the three-dimensional space from the two-dimensional image plane, whereby the position of the calibration jig relative to the camera position can be obtained from the position information of the calibration jig in the captured image captured using the calibrated camera.

The coordinate system setting unit 21 obtains a visual sensor position relative to the reference position set in advance with respect to the robot 2 based on the calibration data stored in the calibration data storage unit 12. This visual sensor position is obtained in different manners between when the camera 4 is a hand camera and when the camera 4 is a fixed camera. Therefore, the coordinate system setting unit 21 determines whether the camera 4 is a hand camera or a fixed camera, from the calibration data stored in the calibration data storage unit 12.

Here, the reference position is a reference position of a base coordinate system normally set at a center of a base of the robot 2, for example. This reference position is required to control the motion of the robot 2 and is set in advance.

When the camera 4 is a fixed camera, the position of the camera 4 is not changed by the motion of the robot 2, and therefore the position of the camera 4 relative to the reference position is acquired from the calibration data of the camera 4, and the position of the camera 4 relative to the reference position when the calibration is implemented is defined as a position of the camera 4 relative to the reference position when an image of the calibration jig is captured (that is, which is the time when the coordinate system setting process is currently performed, and is simply referred to as the time of capturing the image in the following description).

On the other hand, when the camera 4 is a hand camera, the position of the camera 4 is changed in response to the motion of the robot 2, and therefore, the position of the camera 4 relative to a position of the flange 5 that is not changed in response to the motion of the robot 2 after the camera 4 is attached is first acquired from the calibration data stored in the calibration data storage unit 12. In addition, the position of the flange 5 relative to the reference position at the time of capturing the image is acquired from the robot control device 20. Then, a position of the camera 4 relative to the reference position at the time of capturing the image is calculated and obtained based on the acquired position of the camera 4 relative to the position of the flange 5 and the acquired position of the flange 5 relative to the reference position at the time of capturing the image.

The coordinate system setting unit 21 obtains by calculation a position of the calibration jig J relative to the reference position based on the position of the calibration jig J relative to the visual sensor position which is obtained as described above, and the visual sensor position relative to the reference position which is obtained as also described above, and uses the obtained position of the calibration jig relative to the reference position to set a coordinate system for use in control of the robot 2. In this way, the coordinate system for use in control of the robot 2 is set on the calibration jig J.

Figure 3:
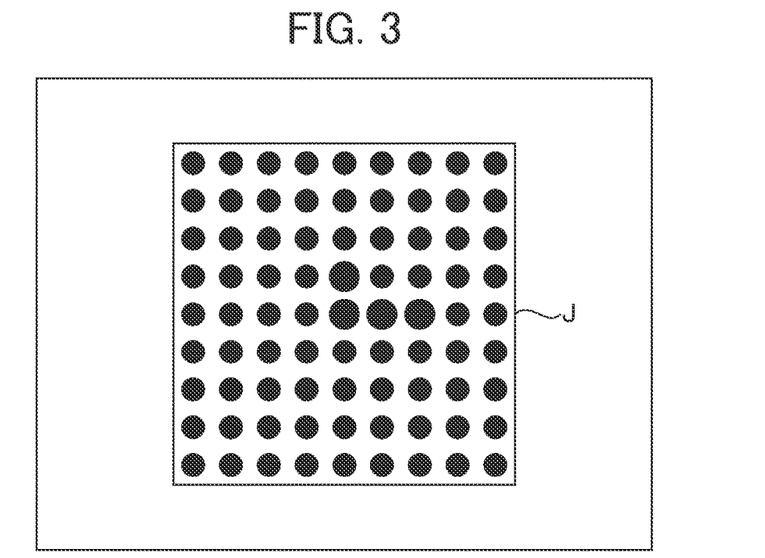
FIG. 3 is a plan view of a calibration jig.

FIG. 3 is a plan view of the calibration jig J. As the calibration jig J, a publicly known calibration jig that can be used for calibration of the camera can be used. The calibration jig J of FIG. 3 is a jig for acquiring information necessary for calibration of the camera 4 by capturing, by means of the camera 4, a dot pattern arranged on the plane, and satisfies three requirements for the dot pattern: (1) grid spacing of the dot pattern is known; (2) a certain number or more of grids are present; and (3) it is possible to uniquely identify which grid each grid corresponds to. The calibration jig J may be not only one in which the feature such as a predetermined dot pattern is arranged on the two-dimensional plane as shown in FIG. 3 but also one in which the feature is arranged in the three-dimensional space, so that three-dimensional position information including the position information in the height direction (Z direction) in addition to the two-dimensional position information (X direction and Y direction) can be obtained (see FIG. 1). The calibration jig J may be the same as or different from one used when the camera 4 is calibrated. Note that the internal parameter of the above-described calibration data is used to calculate the position and the orientation of the dot pattern relative to the position of the camera 4 from the image of the dot pattern captured by the camera 4.

In the first embodiment of the present disclosure, the calibration jig J is disposed at a position for which the coordinate system is to be set. The coordinate system to be set is used in control of the robot 2, and, for example, can be used to calculate a compensation amount for compensating the motion of the robot 2. The coordinate system to be set can be also used for the other coordinate systems used to set a teaching position of the robot 2. In the example shown in FIG. 1, the calibration jig J is mounted on the table T.

Figure 4:
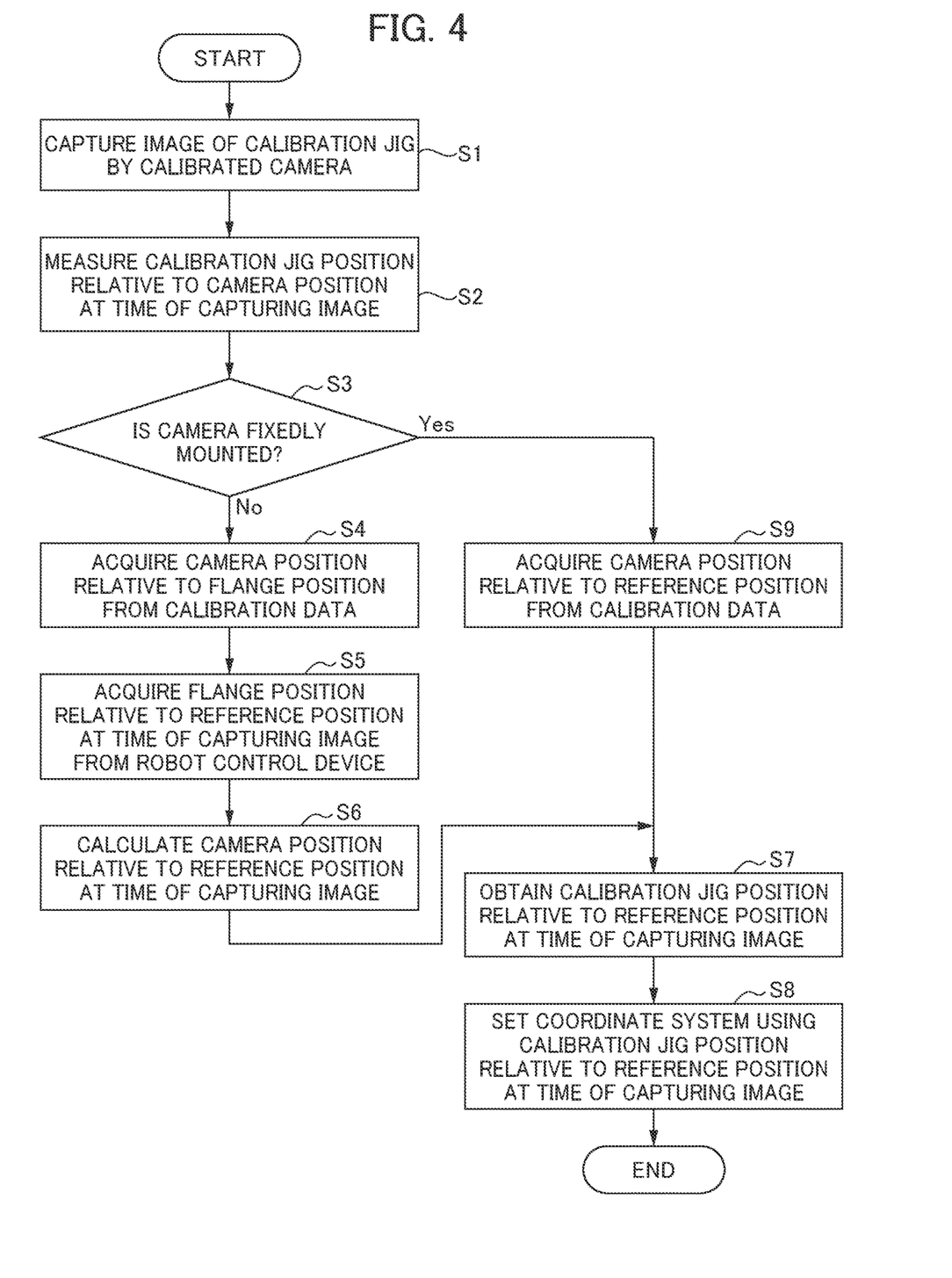
FIG. 4 is a flowchart showing a procedure of a coordinate system setting process in the coordinate system setting system according to the first embodiment of the present disclosure.

Next, a coordinate system setting process in the coordinate system setting system 1 according to the first embodiment of the present disclosure will be described in detail with reference to FIG. 4. FIG. 4 is a flowchart showing a procedure of the coordinate system setting process in the coordinate system setting system 1 according to the first embodiment of the present disclosure. As shown in FIG. 4, in the coordinate system setting process in the coordinate system setting system 1 according to the first embodiment of the present disclosure, an image of the calibration jig J is captured by the calibrated camera 4 to thereby set a coordinate system for use in control of the robot 2.

In Step S1, an image of the calibration jig J is captured using the calibrated camera 4. Thus, the visual sensor control device 10 acquires, as the input image 13, the captured image of the calibration jig J disposed at a position (in the first embodiment of the present disclosure, a top surface of the table T) for which the coordinate system is to be set. After this step, the process proceeds to Step S2.

In Step S2, a position of the calibration jig J relative to the position of the camera 4 when an image of the calibration jig is captured (hereinafter, also simply referred to as the time of capturing the image) is calculated. Specifically, a position of the calibration jig J relative to the position of the camera 4 is calculated using the captured image captured in Step S1 and the calibration data of the camera 4 stored in advance in the calibration data storage unit 12. Note that the position of the calibration jig J relative to the position of the camera 4 can be calculated by the existing calibration calculation. After this step, the process proceeds to Step S3.

In Step S3, it is determined whether the camera 4 is fixedly mounted. When it is determined as NO, that is, when the camera 4 is a hand camera or the like which is attached to the flange 5 of the robot 2 as shown in FIG. 1, the process proceeds to Step S4. On the other hand, when it is determined as YES, that is, when the camera 4 is a fixed camera which is fixed above the table T, for example, the process proceeds to Step S9.

Step S4 is a process performed when the camera 4 is a hand camera attached to the flange 5 of the robot 2 and the position of the camera 4 is changed in response to the motion of the robot 2. Therefore, in this step, the position of the camera 4 relative to the position of the flange 5 which is not changed in response to the motion of the robot 2 after the camera 4 is attached is acquired from the calibration data. Note that when the camera 4 is a hand camera, the relative position of the flange 5 and the camera 4 is obtained as the external parameter of the calibration when the calibration is implemented. After this step, the process proceeds to Step S5.

In Step S5, a position of the flange 5 relative to the reference position at the time of capturing the image is acquired from the robot control device 20. Here, the position information of the flange 5 relative to the reference position set in advance can be always acquired from the robot control device 20 that generates a motion command with respect to the robot 2. After this step, the process proceeds to Step S6.

In Step S6, a position of the camera 4 relative to the reference position at the time of capturing the image is calculated. Specifically, a position of the camera 4 relative to the reference position at the time of capturing the image is calculated based on the position of the camera 4 relative to the position of the flange 5 which is acquired in Step S4 and the position of the flange 5 relative to the reference position at the time of capturing the image which is acquired in Step S5. After this step, the process proceeds to Step S7.

In Step S7, a position of the calibration jig J relative to the reference position at the time of capturing the image is calculated and obtained. Specifically, a position of the calibration jig J relative to the reference position at the time of capturing the image is calculated based on the position of the calibration jig J relative to the position of the camera 4 at the time of capturing the image which is calculated in Step S2 and the position of the camera 4 relative to the reference position at the time of capturing the image which is calculated in Step S6. After this step, the process proceeds to Step S8.

In Step S8, a coordinate system for use in control of the robot 2 is set using the position of the calibration jig J relative to the reference position at the time of capturing the image which is calculated and obtained in Step S7, and this process ends.

On the other hand, Step S9 is a process performed when the camera 4 is a fixed camera fixed above the table T, for example, and the position of the camera 4 is not changed in response to the motion of the robot 2. Therefore, in this step, a position of the camera 4 relative to the reference position is acquired from the calibration data of the camera 4, and the position of the camera 4 relative to the reference position when the calibration is implemented is defined as a position of the camera 4 relative to the reference position at the time of capturing the image. Note that when the camera 4 is a fixed camera, the position of the camera 4 relative to the reference position is obtained as the external parameter of the calibration when the calibration is implemented. After this step, the process sequentially proceeds to the above-described Step S7 and Step 8, and after each procedure described above is executed, this process ends.

According to the coordinate system setting system 1 according to the first embodiment of the present disclosure, the following effects can be achieved. The coordinate system setting system 1 according to the first embodiment of the present disclosure is provided with the calibrated camera 4, the calibration data storage unit 12 that stores, in advance, calibration data obtained when the camera 4 is calibrated, the image processing unit 11 that processes a captured image obtained by capturing, by means of the camera 4, an image of the calibration jig J disposed at a position for which a coordinate system is to be set, and the coordinate system setting unit 21 that uses a result of the image processing performed by the image processing unit 11 to set a coordinate system for use in control of the robot 2. The coordinate system setting unit 21 is configured to obtain a position of the calibration jig J relative to the position of the camera based on the captured image obtained by capturing, by means of the camera 4, the image of the calibration jig J and the calibration data, and to obtain a position of the camera 4 relative to the reference position based on the calibration data. In addition, the coordinate system setting unit 21 is configured to obtain a position of the calibration jig J relative to the reference position based on the obtained position of the calibration jig J relative to the obtained position of the camera 4 and the position of the camera 4 relative to the obtained reference position, and to use the obtained position of the calibration jig J relative to the reference position to set a coordinate system for use in control of the robot 2.

This makes it possible to easily set a coordinate system for use in control of the robot 2 without need for a teacher's robot operation by capturing, by means of the calibrated camera 4, the image of the calibration jig J disposed at a position for which the coordinate system is to be set. Therefore, there can be avoided a risk of a teacher, who is unfamiliar to the robot operation, setting a wrong coordinate system to make it impossible to control the robot 2 as expected. There has conventionally been a technique in which a coordinate system is automatically set to a calibration jig, but the technique needs to capture an image of the calibration jig from a plurality of viewpoints, which requires time and which is impossible to do by means of one fixed camera. However, the first embodiment of the present disclosure allows for easy setting of the coordinate system in a short period of time by one-time capturing of an image by means of one camera.

In the first embodiment of the present disclosure, when the camera 4 is a fixed camera, the configuration is adopted such that the position of the camera 4 relative to the reference position acquired from the calibration data is defined as the visual sensor position relative to the reference position. Alternatively, when the camera 4 is a hand camera, the configuration is adopted such that the position of the camera 4 relative to the reference position when an image of the calibration jig is captured is obtained based on the position of the camera 4 relative to the position of the flange 5 which is acquired from the calibration data and the position of the flange 5 relative to the reference position when an image of the calibration jig is captured.

This can obtain the same effects as the above in either case of when the camera 4 is a hand camera and when the camera 4 is a fixed camera.

SECOND EMBODIMENT

In the above-described first embodiment, an example has been described in which the calibration jig J is mounted on the table T, but in a second embodiment of the present disclosure, a calibration jig J may be provided to a flange 5 of a robot 2. Also in this case, a camera 4 may be either of a fixed camera and a hand camera. Hereinafter, the second embodiment of the present disclosure will be described with reference to FIGS. 5 and 6, but the same components as in the above-described first embodiment are denoted with the same reference symbols, and the description thereof will be omitted as appropriate.

Figure 5:
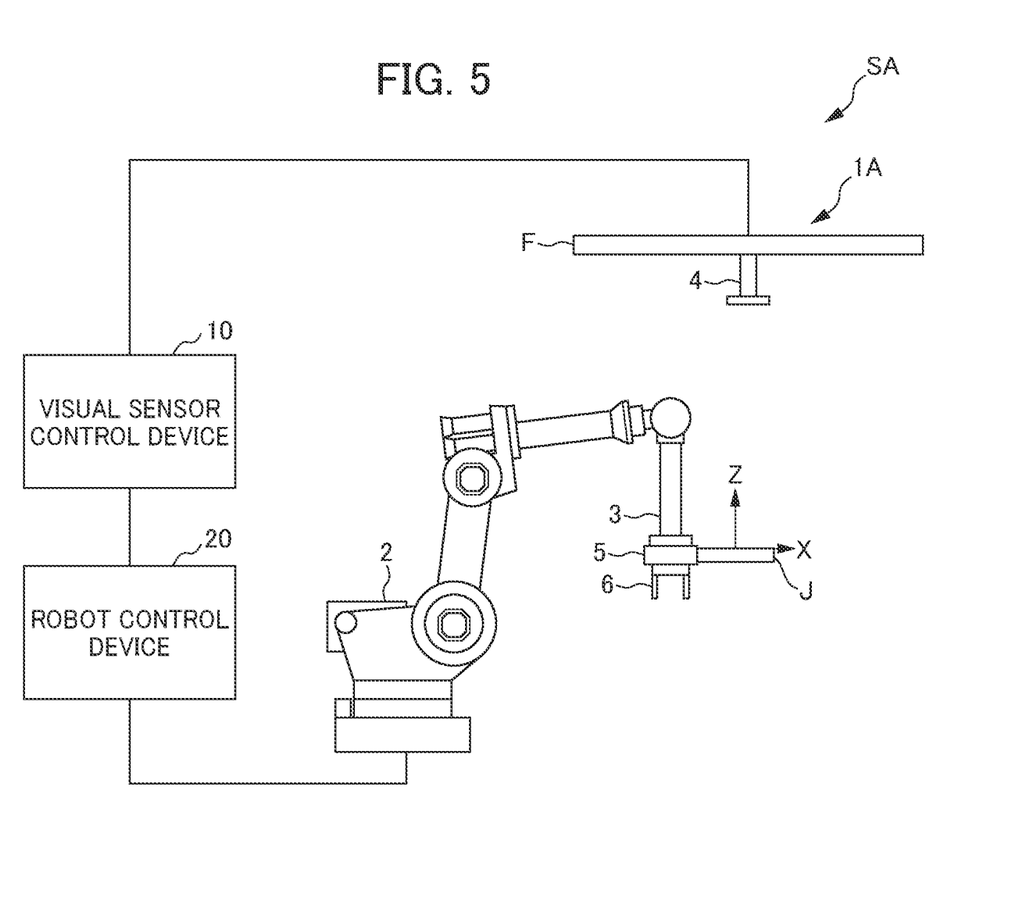
FIG. 5 is a diagram showing a configuration of a robot system according to a second embodiment of the present disclosure.

FIG. 5 is a diagram showing a configuration of a robot system SA according to the second embodiment of the present disclosure. The robot system SA is configured to include a coordinate system setting system 1A according to the second embodiment of the present disclosure. The robot system SA includes the robot 2 serving as an industrial machine, the camera 4 serving as a visual sensor, a visual sensor control device 10, a robot control device 20, and the calibration jig J.

The coordinate system setting system 1A according to the second embodiment of the present disclosure has the same configuration of the coordinate system setting system 1 according to the above-described first embodiment. That is, the coordinate system setting system 1A according to the second embodiment of the present disclosure includes the camera 4 serving as a visual sensor, an image processing unit 11 and a calibration data storage unit 12 that constitute the visual sensor control device 10, and a coordinate system setting unit 21 that constitutes the robot control device 20.

The second embodiment of the present disclosure is different from the first embodiment in that the camera 4 is a fixed camera attached to a predetermined fixing part F arranged above the robot 2. In addition, the second embodiment is different from the first embodiment in that the calibration jig J is provided to the flange 5 of the robot 2.

The second embodiment of the present disclosure is different from the first embodiment in a part of the contents of the coordinate system setting process to be performed by the coordinate system setting unit 21. Specifically, the coordinate system setting unit 21 in the second embodiment of the present disclosure obtains a position of the calibration jig J relative to a position of the camera 4 based on a captured image obtained by capturing, by means of the camera 4, an image of the calibration jig J provided to the flange 5, obtains a position of the camera 4 relative to a reference position when an image of the calibration jig J is captured based on the calibration data, and obtain, based on the obtained positions of the calibration jig J and the camera 4, a position of the calibration jig J relative to the reference position when an image of the calibration jig J is captured. In addition, the coordinate system setting unit 21 obtains a position of the calibration jig J relative to a position of the flange 5 based on the position of the calibration jig J relative to the reference position when an image of the calibration jig J is captured and the position of the flange 5 relative to the reference position when an image of the calibration jig J is captured. Then, the coordinate system setting unit 21 uses the obtained position of the calibration jig J relative to the position of the flange 5 to set a coordinate system for use in control of the robot 2.

Figure 6:
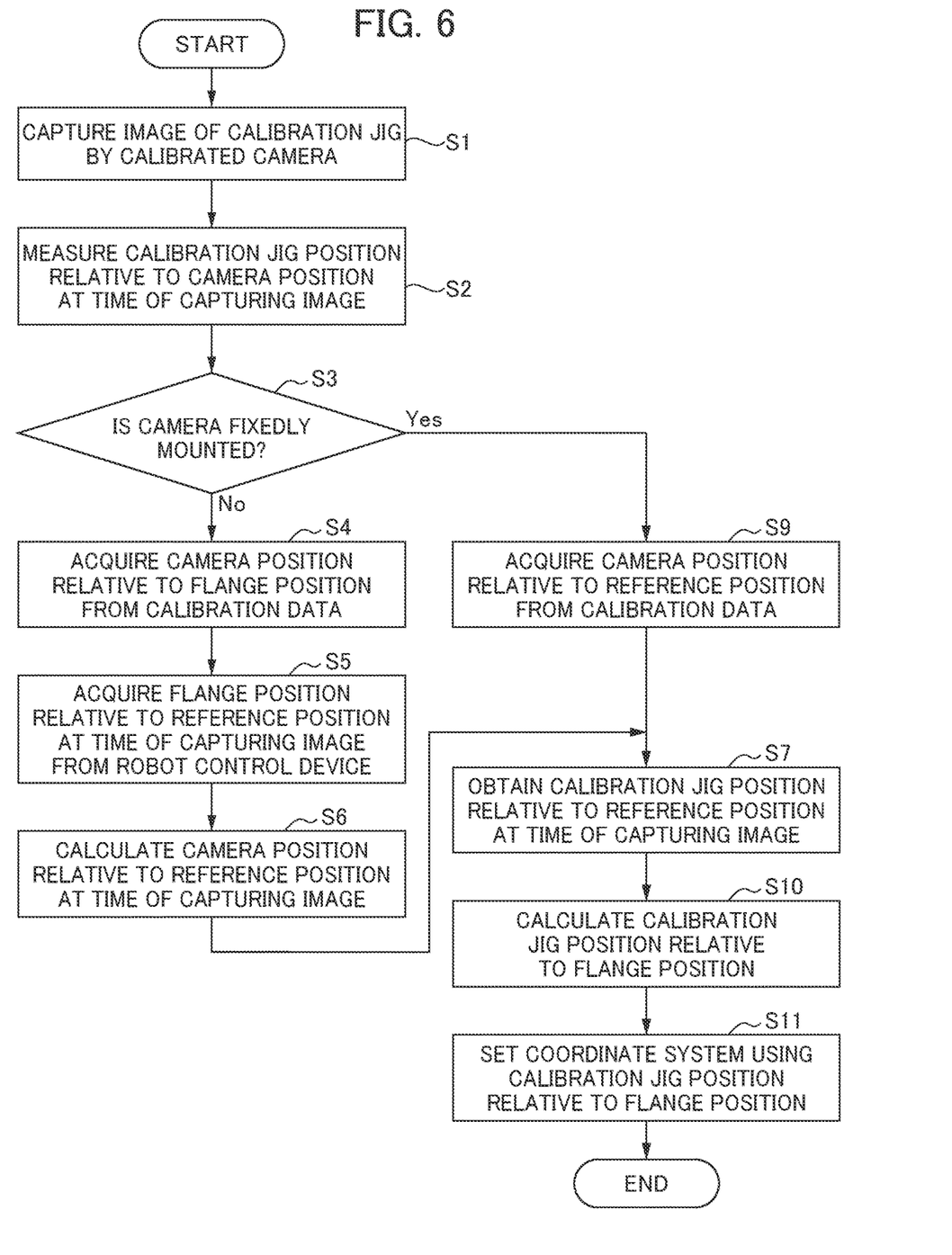
FIG. 6 is a flowchart showing a procedure of a coordinate system setting process in a coordinate system setting system according to the second embodiment of the present disclosure.

FIG. 6 is a flowchart showing a procedure of a coordinate system setting process in the coordinate system setting system 1A according to the second embodiment of the present disclosure. As shown in FIG. 6, Steps S1 to S7 and Step S9 of the coordinate system setting process in the coordinate system setting system 1A according to the second embodiment of the present disclosure are the same as Steps S1 to S7 and Step S9 in the coordinate system setting process in the coordinate system setting system 1 according to the above-described first embodiment, respectively.

Step S10 is performed after Step S7. In this step, a position of the calibration jig J relative to the position of the flange 5 is calculated. Specifically, a position of the calibration jig J relative to the position of the flange 5 is obtained based on the position of the calibration jig J relative to the reference position when an image of the calibration jig J is captured which is obtained in Step S7, and the position of the flange 5 relative to the reference position when an image of the calibration jig J is captured which is obtained in Step S5. After this step, the process proceeds to Step S11.

In Step S11, a coordinate system for use in control of the robot 2 is set using the position of the calibration jig J relative to the position of the flange 5 which is obtained in Step S10, and this process ends.

As described above, the coordinate system for controlling the robot 2 is set to the flange 5 of the robot 2, and the same effects as those in the above-described first embodiment are obtained.

THIRD EMBODIMENT

Figure 7:
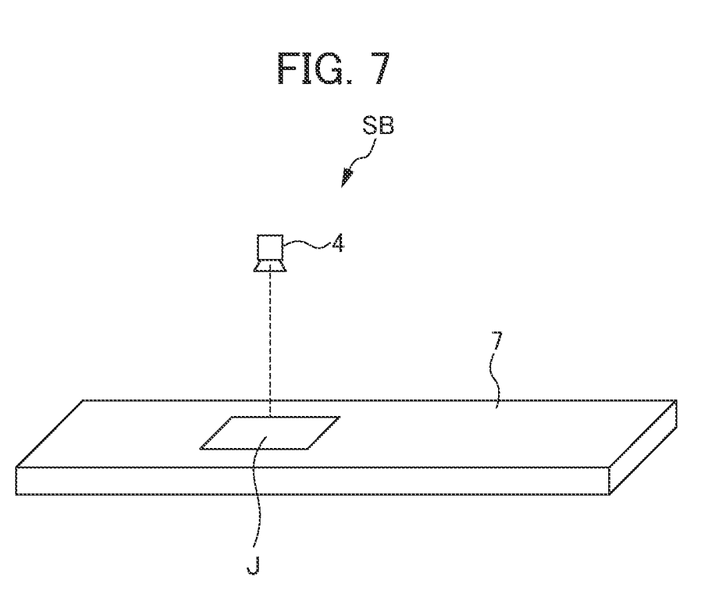
FIG. 7 is a diagram showing a robot system according to a third embodiment of the present disclosure.
Figure 8:
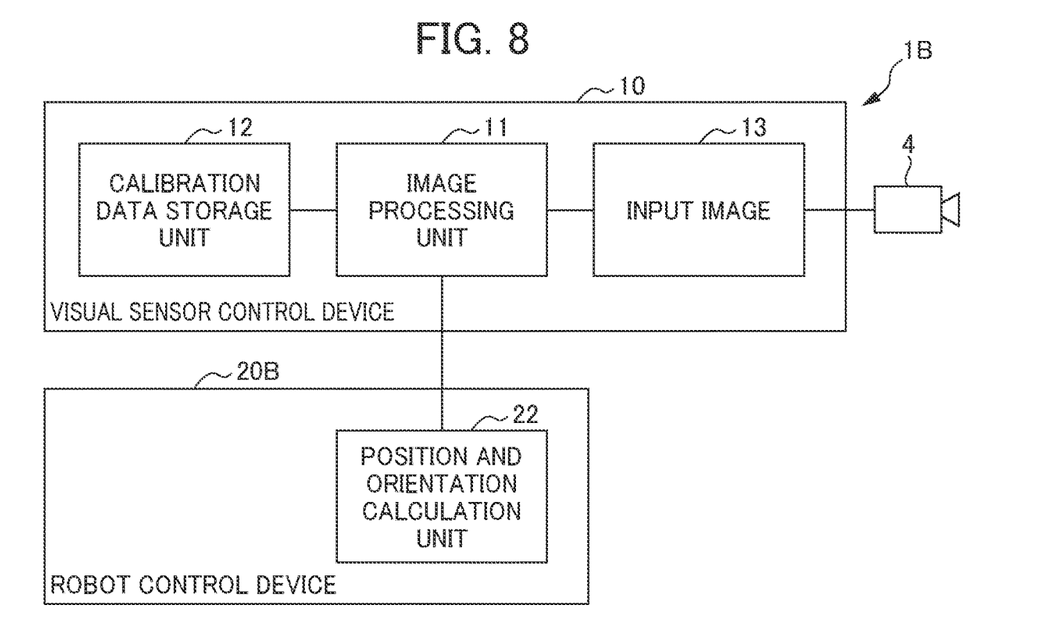
FIG. 8 is a block diagram showing a configuration of a position and orientation measurement system according to the third embodiment of the present disclosure.
Figure 9:
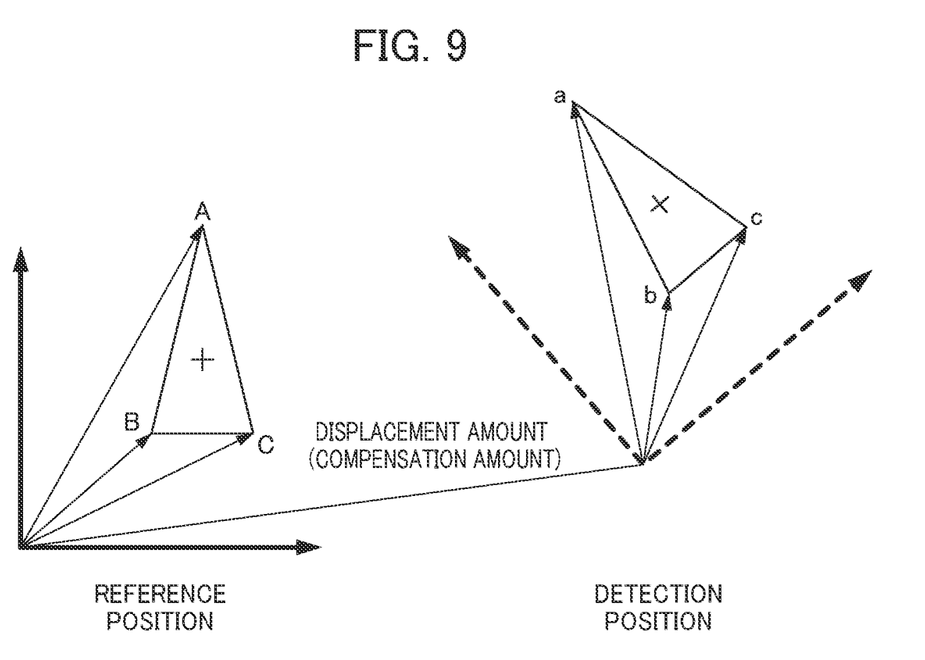
FIG. 9 is a diagram for explaining a compensation amount in motion.

In the above-described first embodiment and second embodiment, the coordinate system setting system 1 has been proposed in which a coordinate system is set using the position of the calibration jig J relative to the reference position, but in a third embodiment of the present disclosure, a position and orientation measurement system 1B is proposed which calculates three-dimensional positions and orientations of a calibration jig J as viewed from a reference position, Hereinafter, the third embodiment of the present disclosure will be described with reference to FIGS. 7 to 9, but the same components as in the above-described first embodiment are denoted with the same reference symbols, and the description thereof will be omitted as appropriate, FIG. 7 is a diagram showing a robot system SA according to the third embodiment of the present disclosure. FIG. 8 is a block diagram showing a configuration of a position and orientation measurement system according to the third embodiment of the present disclosure. FIG. 9 is a diagram for explaining a compensation amount in motion, Note that in FIG. 7, the robot 2, the visual sensor control device 10, and the robot control device 20B are not shown.

As shown in FIG. 7, in the present embodiment, an image of the calibration jig J placed on a surface of a machine tool 7 is captured by the calibrated camera 4 held by the robot 2. As shown in FIG. 8, the position and orientation measurement system 1B according to the present embodiment includes a position and orientation calculation unit 22, and the position and orientation calculation unit 22 measures three-dimensional positions and orientations (X, Y, Z, W, P, R) of the calibration jig J as viewed from the camera 4, and calculates three-dimensional positions and orientations of the machine tool 7 with respect to the robot 2 from the measured three-dimensional positions and orientations.

More particularly, the position and orientation calculation unit 22 according to the present embodiment obtains three-dimensional positions and orientations of the calibration jig J relative to the camera position based on the captured image obtained by capturing, by means of the camera 4, an image of the calibration jig J and the calibration data. The position and orientation calculation unit 22 obtains a camera position relative to a reference position set in advance with respect to the robot 2, the reference position being stored in the calibration data. Furthermore, the position and orientation calculation unit 22 obtains three-dimensional positions and orientations of the calibration jig J relative to the reference position based on the three-dimensional positions and orientations of the calibration jig J relative to the camera position and the camera position relative to the reference position. In this way, three-dimensional positions and orientations of the machine tool 7 on which the calibration jig J is placed, with respect to the robot 2, are acquired.

As described above, the position and orientation measurement system 1B according to the present embodiment can acquire the three-dimensional positions and orientations of the machine tool 7 with respect to the robot 2. Therefore, a displacement amount can be obtained as a compensation amount by a compensation unit (not shown) from the acquired current three-dimensional positions and orientations and original reference positions and orientations, and the motion of the robot 2 can be compensated by the compensation amount. Specifically, as shown in FIG. 9, the coordinate system itself is moved and rotated so that the machine tool 7 located at the current detection position overlaps with that located at the reference position, and the obtained amount of movement of the coordinate system is defined as the displacement amount (compensation amount), which makes it possible to easily compensate predetermined motion of the robot 2. Note that, FIG. 9 provides two-dimensional representation, but can also provide the three-dimensional representation basically in the same manner.

It is noted that the present disclosure is not limited to the above-described embodiments, and includes modifications and improvements within the scope which can achieve the object of the present disclosure.

For example, the coordinate system setting system 1, 1A is applied to the setting of the coordinate system for use in control of the robot 2, but is not limited thereto. The coordinate system setting system is also applicable to setting of the coordinate system for use in control of various machine tools other than the robot 2.

EXPLANATION OF REFERENCE NUMERALS 1, 1A Coordinate system setting system
1B Position and orientation measurement system
2 Robot
3 Robot arm
4 Camera (visual sensor)
5 Flange
6 Hand tip tool
10 Visual sensor control device
11 Image processing unit
12 Calibration data storage unit
13 Input image
20, 20B Robot control device
21 Coordinate system setting unit
22 Position and orientation calculation unit
J Calibration jig
S, SA, SB Robot system
T Table

The invention claimed is:

1. A coordinate system setting system that sets a coordinate system for use in control of an industrial machine, the coordinate system setting system comprising:
a calibrated visual sensor; and
a processor, the processor being configured to
store, in advance, calibration data obtained when the visual sensor is calibrated;
process a captured image obtained by capturing, by means of the visual sensor, an image of a calibration jig disposed at a position for which the coordinate system is to be set; and
use a result of the image processing to set a coordinate system for use in control of the industrial machine, wherein the processor obtains
a position of the calibration jig relative to a visual sensor position obtained based on the captured image obtained by capturing, by means of the visual sensor, the image of the calibration jig and the calibration data,
a visual sensor position relative to a reference position of a base coordinate system stored in the calibration data and set at a center of a base of the industrial machine, the reference position being set in advance with respect to the industrial machine, and
a position of the calibration jig relative to the reference position based on the position of the calibration jig relative to the visual sensor position and the visual sensor position relative to the reference position, and
uses the position of the calibration jig relative to the reference position to set a coordinate system, and controls the industrial machine in the set coordinate system.

2. The coordinate system setting system according to claim 1, wherein
the industrial machine is
a robot having a robot arm and a flange connecting the robot arm and a hand tip tool, and
the processor
defines a camera position relative to the reference position acquired from the calibration data as the visual sensor position relative to the reference position, when the visual sensor is a fixed camera, and
obtains a visual sensor position relative to a reference position when an image of the calibration jig is captured based on a camera position relative to a flange position acquired from the calibration data and a position of the flange relative to the reference position when the image of the calibration jig is captured, when the visual sensor is a hand camera attached to the flange.

3. The coordinate system setting system according to claim 1, wherein
the industrial machine is
a robot having a robot arm and a flange connecting the robot arm and a hand tip tool,
the processor
processes a captured image obtained by capturing, by means of the visual sensor, an image of the calibration jig provided to the flange,
obtains a position of the calibration jig relative to a visual sensor position obtained based on the captured image obtained by capturing, by means of the visual sensor, the image of the calibration jig and the calibration data,
a visual sensor position relative to a reference position set in advance with respect to the industrial machine, the reference position being stored in the calibration data, and
a position of the calibration jig relative to the reference position based on the position of the calibration jig relative to the visual sensor position and the visual sensor position relative to the reference position,
obtains a position of the calibration jig relative to a position of the flange based on the position of the calibration jig relative to the reference position and the position of the flange relative to the reference position acquired from the industrial machine, and
uses the position of the calibration jig relative to the position of the flange to set a coordinate system for use in control of the industrial machine.

4. The coordinate system setting system according to claim 1, wherein the visual sensor is a two-dimensional camera.

5. A position and orientation measurement system that measures three-dimensional positions and orientations of a calibration jig as viewed from a reference position of an industrial machine, the position and orientation measurement system comprising:
a calibrated visual sensor; and
a processor, the processor being configured to
store, in advance, calibration data obtained when the visual sensor is calibrated;
process a captured image obtained by capturing, by means of the visual sensor, an image of the calibration jig; and
calculate three-dimensional positions and orientations of the calibration jig as viewed from the reference position of the industrial machine using a result of the image processing,
wherein the processor obtains
a position of the calibration jig relative to a visual sensor position obtained based on the captured image obtained by capturing, by means of the visual sensor, the image of the calibration jig and the calibration data,
a visual sensor position relative to a reference position of a base coordinate system stored in the calibration data and set at a center of a base of the industrial machine, the reference position being set in advance with respect to the industrial machine, and a position of the calibration jig relative to the reference position based on the position of the calibration jig relative to the visual sensor position and the visual sensor position relative to the reference position, and compensates a motion of the industrial machine based on the obtained position of the calibration jig relative to the reference position.

6. The position and orientation measurement system according to claim 5, wherein the industrial machine is a robot having a robot arm and a flange connecting the robot arm and a hand tip tool, and the processor defines a camera position relative to the reference position acquired from the calibration data as the visual sensor position relative to the reference position, when the visual sensor is a fixed camera, and obtains a visual sensor position relative to a reference position when an image of the calibration jig is captured based on a camera position relative to a flange position acquired from the calibration data and a position of the flange relative to the reference position when the image of the calibration jig is captured, when the visual sensor is a hand camera attached to the flange.

7. The position and orientation measurement system according to claim 5, wherein the industrial machine is a robot having a robot arm and a flange connecting the robot arm and a hand tip tool, the processor processes a captured image obtained by capturing, by means of the visual sensor, an image of the calibration jig provided to the flange, obtains a position of the calibration jig relative to a visual sensor position obtained based on the captured image obtained by capturing, by means of the visual sensor, the image of the calibration jig and the calibration data, a visual sensor position relative to a reference position set in advance with respect to the industrial machine, the reference position being stored in the calibration data, and a position of the calibration jig relative to the reference position based on the position of the calibration jig relative to the visual sensor position and the visual sensor position relative to the reference position, obtains a position of the calibration jig relative to a position of the flange based on the position of the calibration jig relative to the reference position and the position of the flange relative to the reference position acquired from the industrial machine, and uses the position of the calibration jig relative to the position of the flange to set a coordinate system for use in control of the industrial machine.

8. The position and orientation measurement system according to claim 5, wherein the visual sensor is a two-dimensional camera.

* * * * *